United States Patent [19]

Beck et al.

[11] Patent Number: 6,125,007
[45] Date of Patent: Sep. 26, 2000

[54] MEMBRANE SEAL SECURED TO INNER AND OUTER OSCILLATING BEARING MEMBERS FOR SMALL ANGLE OSCILLATIONS WITHIN CONFINED AXIAL SPACE

[75] Inventors: John Lowell Beck; Thomas Allen Gregory; Christopher Guild Keller, all of Rochester, Minn.

[73] Assignee: International Business Machines Corporation, Armonk, N.Y.

[21] Appl. No.: 08/305,225

[22] Filed: Sep. 13, 1994

Related U.S. Application Data

[63] Continuation of application No. 07/922,290, Jul. 30, 1992, Pat. No. 5,416,657.

[51] Int. Cl.[7] .............................. G11B 17/02; G11B 5/55; F16C 33/76
[52] U.S. Cl. .................... 360/106; 360/97.02; 384/477
[58] Field of Search ................................ 360/106, 97.02; 384/477, 145, 146; 277/200, 212 C, 212 F, 207 R, 213

[56] References Cited

U.S. PATENT DOCUMENTS

| | | | |
|---|---|---|---|
| 2,946,609 | 7/1960 | Comery | 277/53 |
| 3,700,297 | 10/1972 | Fickenwirth et al. | 308/187.2 |
| 4,426,090 | 1/1984 | Bender | 277/27 |
| 4,444,400 | 4/1984 | Norman | 277/213 |
| 4,483,569 | 11/1984 | Smith | 384/145 |
| 4,722,616 | 2/1988 | Lederman | 384/482 |
| 5,023,733 | 6/1991 | Koga et al. | 360/106 |
| 5,046,868 | 9/1991 | Albert | 384/477 |

*Primary Examiner*—Robert S. Tupper
*Assistant Examiner*—K. M. Watkins
*Attorney, Agent, or Firm*—Freling Baker

[57] ABSTRACT

A bearing seal assembly for an oscillating actuator, comprises an outer bearing raceway, an inner bearing raceway mounted concentric with the outer raceway, and an annular deformable liquid impermeable membrane having an axial length of not more than one tenth the radius thereof, an inner peripheral edge sealingly secured to the inner bearing raceway, and an outer peripheral edge sealingly secured to the outer raceway for enabling limited relative rotation between the inner raceway and the outer raceway with minimum axial distortion of said membrane. In one embodiment, the membrane is stretched to eliminate surface distortion under torsional stress. Another embodiment illustrates waves molded into the membrane for reducing torsional forces.

20 Claims, 4 Drawing Sheets

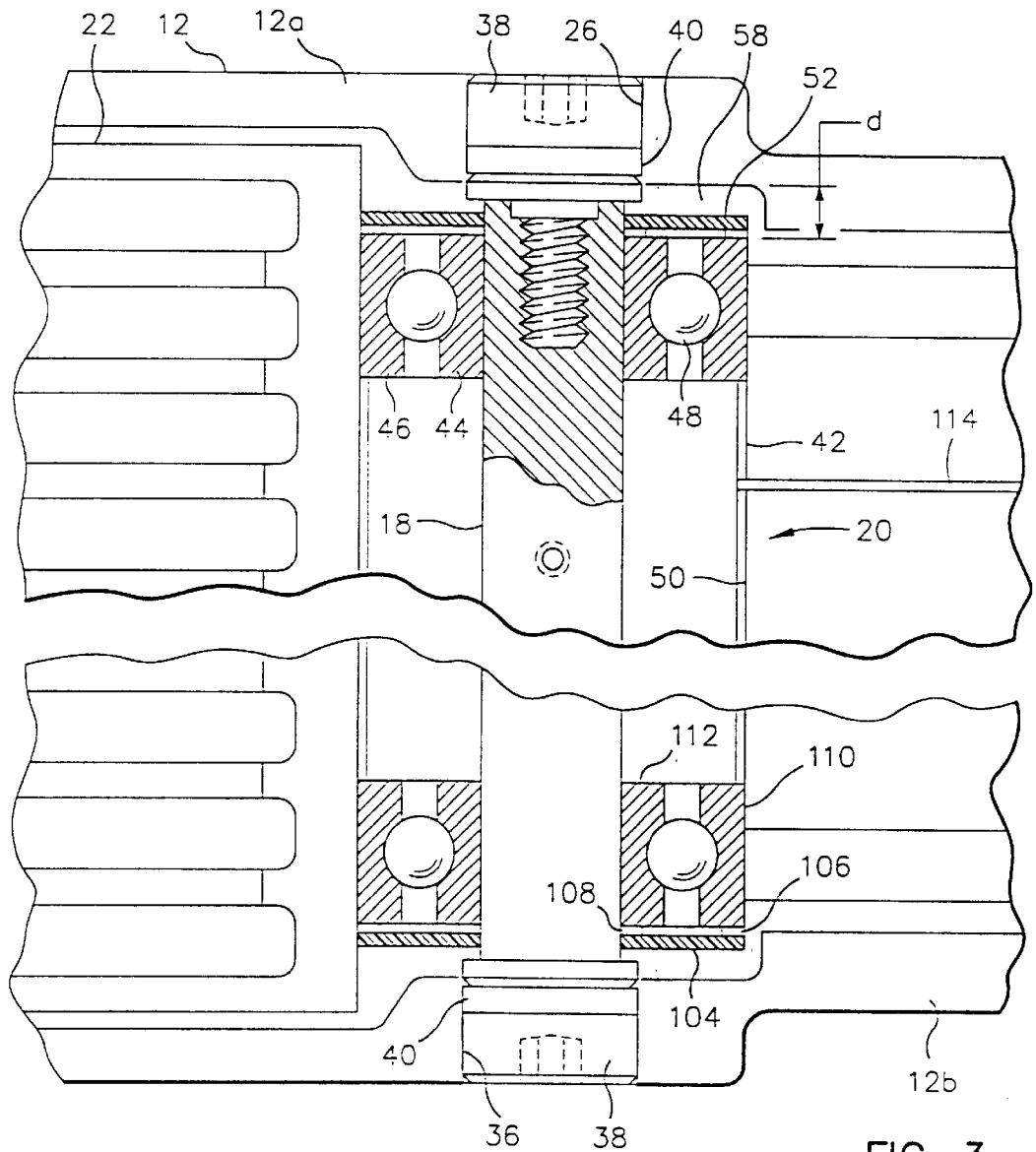
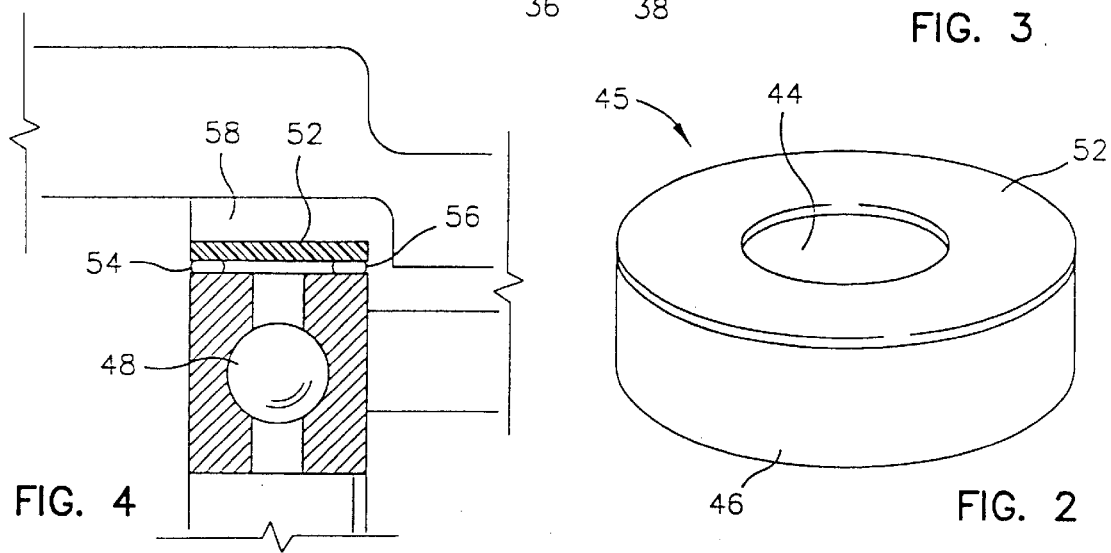
FIG. 3
FIG. 4
FIG. 2

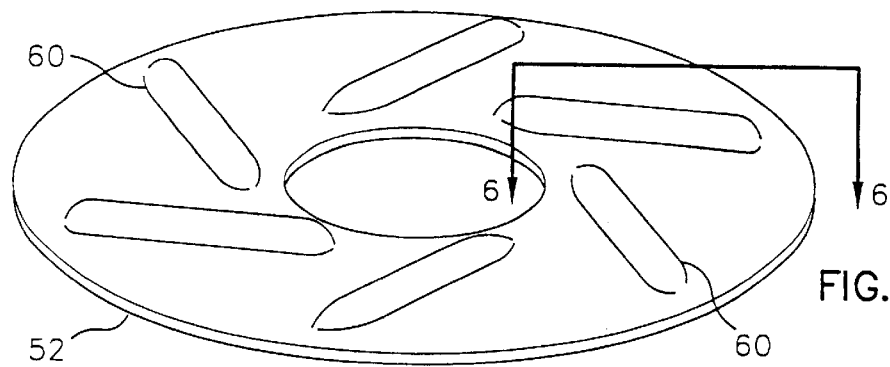
FIG. 5
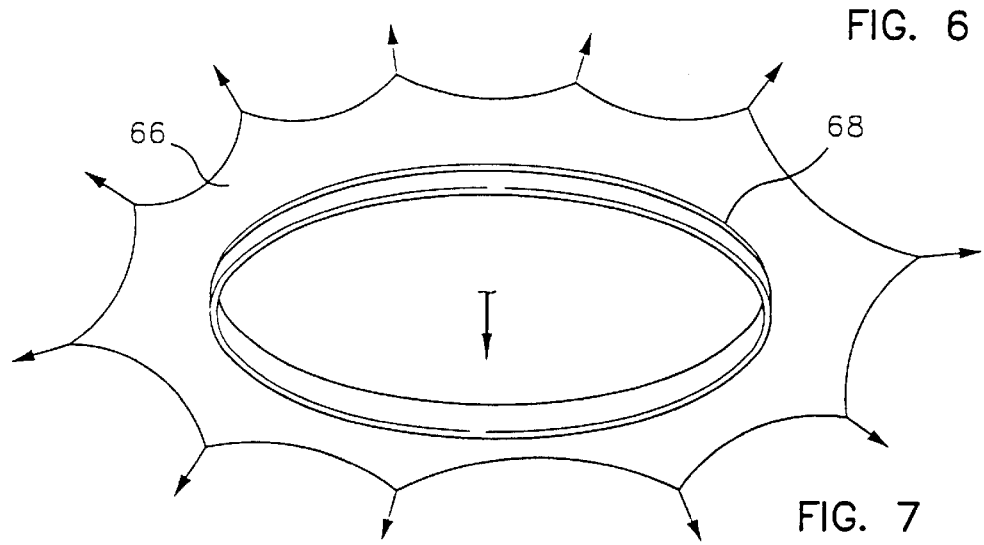
FIG. 6
FIG. 7
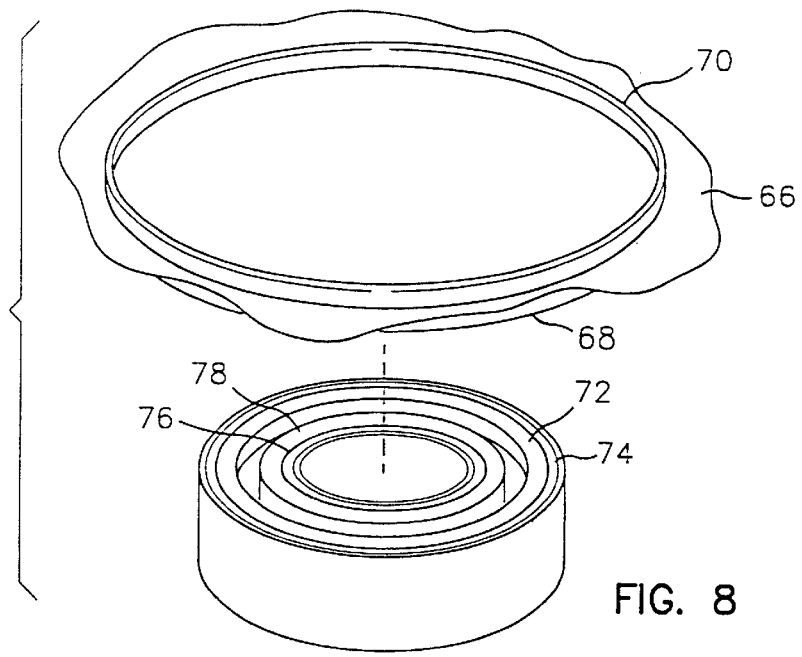
FIG. 8

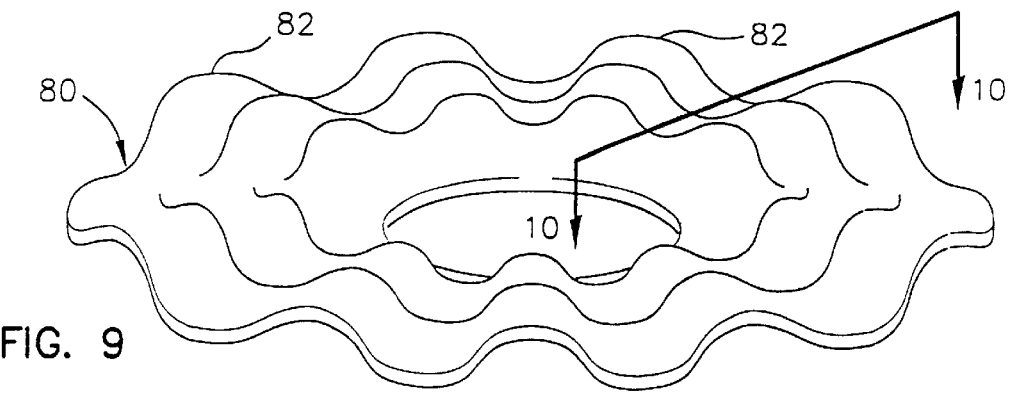
FIG. 9
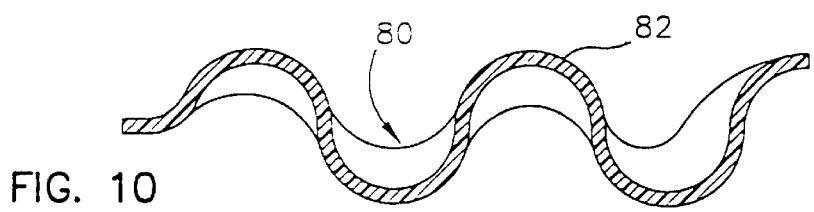
FIG. 10
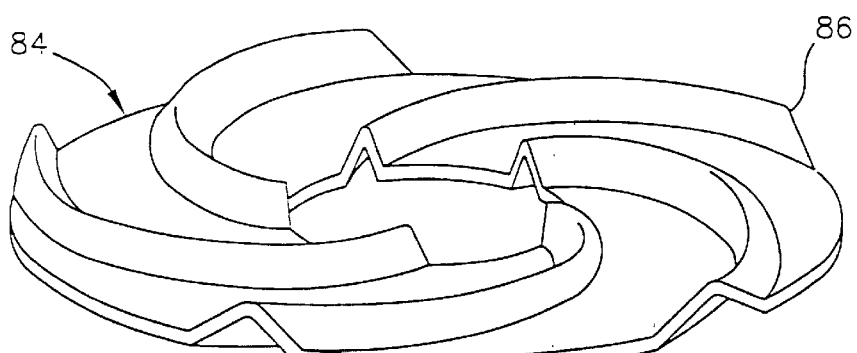
FIG. 11
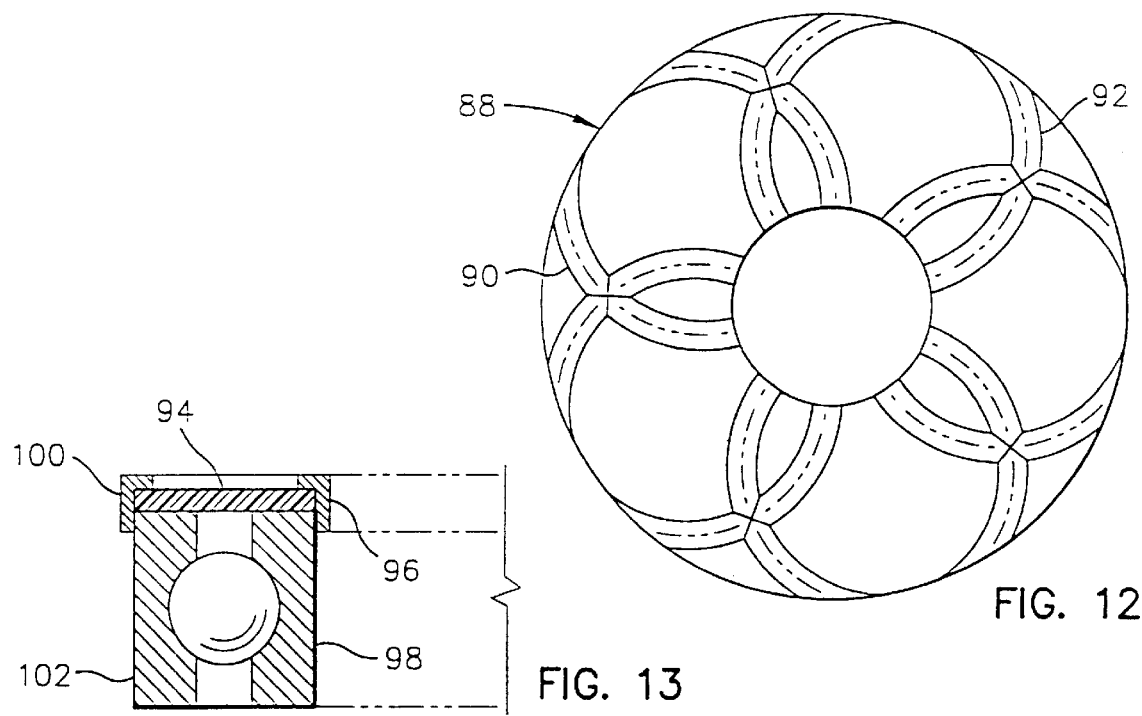
FIG. 12
FIG. 13

MEMBRANE SEAL SECURED TO INNER AND OUTER OSCILLATING BEARING MEMBERS FOR SMALL ANGLE OSCILLATIONS WITHIN CONFINED AXIAL SPACE

This application is a continuation division of application Ser. No. 07/922,290, filed Jul. 30, 1992 (Pending), (status, abandoned, pending, etc.). U.S. Pat. No. 5,416,657.

BACKGROUND OF THE INVENTION

The present invention relates to sealed bearings for small angle applications and pertains particularly to an improved bearing seal for use on rotary actuators for rigid disk magnetic data storage devices.

Hard disk storage devices have a head to disk interface that is very sensitive to and cannot tolerate contaminants. Such storage devices have moving parts, such as actuators and arms that are mounted on lubricated ball or roller bearings. Pressure and temperature changes within the storage devices cause air flow through the bearings. This air flow picks up and carries small particles of grease, and evaporated organic particles which can reach and deposit on the recording disk surfaces. These contaminants can interfere with the performance of the carefully designed lubricant that is applied thereto.

In accordance with the present state of the art, side shields or rubber seals are provided to impede the transport of grease out of the bearing cartridge. However, in order to allow rotation of the spindle, spacing is provided between the inside diameter of the shield (or rubber seals) and the outside of the inner race of the bearing, which allows contaminants to pass through in three ways:

1. Grease vapors diffuse through this gap at all times.
2. Turbulence induced by high speed accessing convects vapors, and aerosols through the gap.
3. Pressure difference between the top and bottom of the bearing cartridge causes axial flow which carries aerosols and vapors of the grease.

The form factor of the disk drive imposes such severe constraints of the allowable axial length of seals that no known seals can be used. For example, bellows type seals have been used in certain applications where space is not a factor. See for example, U.S. Pat. No. 3,700,297 issued Oct. 24, 1972 to Fickenwirth, et al. for an aircraft control surface. Other examples of the prior art are illustrated in U.S. Pat. No. 4,208,060 issued Jun. 17, 1980 to St. Lauret, Jr; U.S. Pat. No. 3,489,019 issued Jan. 13, 1970 to Giegerich; and U.S. Pat. No. 2,469,114 issued May 3, 1949 to Hofst.

Accordingly, it is desirable that compact highly effective seals that allow small angles of oscillation be available.

SUMMARY AND OBJECTS OF THE INVENTION

It is the primary object of the present invention to provide an improved bearing seal for use on rotary actuators for rigid disk magnetic data storage devices.

In accordance with a primary aspect of the present invention, an annular membrane seal is secured between inner and outer raceways of a bearing assembly and is constructed to enable small angles of rotation from a neutral position with minimal torque and minimal axial distortion. In one embodiment, the membrane is prestretched to eliminate axial distortion within the range of movement. In another embodiment, waves are molded into the membrane that enable bending of the membrane with minimum stretching within the desired range of motions.

BRIEF DESCRIPTION OF THE DRAWINGS

The above and other objects and advantages of the present invention will become apparent from the following description when read in conjunction with the accompanying drawings wherein:

FIG. 2 is a perspective view of a preferred embodiment of the invention;

FIG. 3 is a detailed fragmentary view in section showing details of the bearing and seal assemblies;

FIG. 4 is an enlarged detailed view of a portion of the seal of FIG. 3;

FIG. 5 is a perspective view illustrating the distortion of a flat annular membrane seal under torsion;

FIG. 6 is a section view taken on line 6—6 of FIG. 5;

FIG. 7 is a perspective view from below of a membrane seal in accordance with the one embodiment of invention shown in a first step of assembly;

FIG. 8 is a perspective view of the embodiment of FIG. 7;

FIG. 9 is a perspective view of a membrane seal in accordance with an alternate embodiment of the invention;

FIG. 10 is a view taken on line 10—10 of FIG. 9;

FIG. 11 is a perspective view of a membrane seal in accordance with another embodiment of the invention;

FIG. 12 is a top plan view of a membrane seal in accordance with a further embodiment of the invention; and FIG. 13 is a section view of a membrane seal attached in accordance with another embodiment of the invention.

DETAILED DESCRIPTION OF THE PREFERRED EMBODIMENTS

Figure 1:
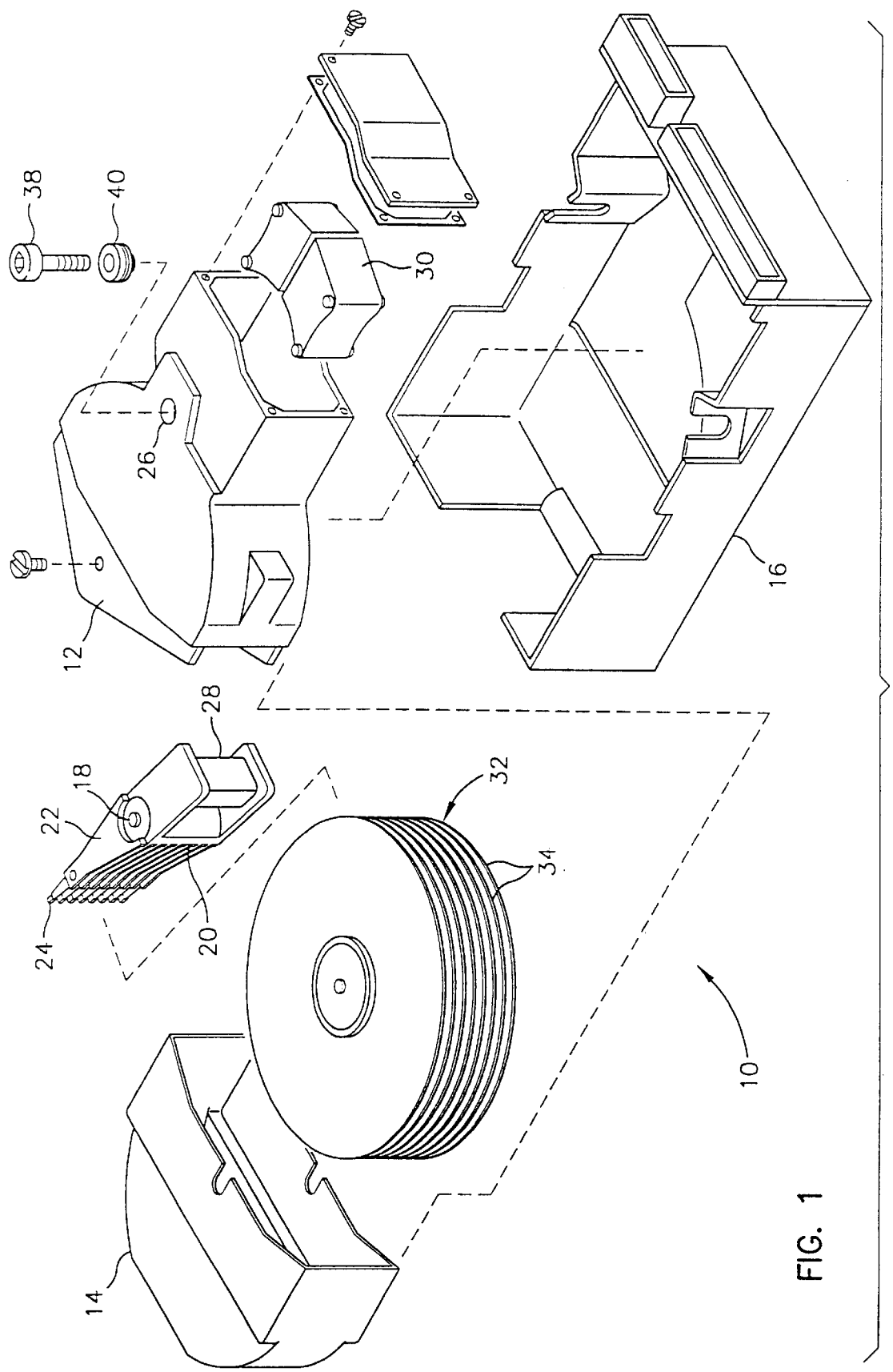
FIG. 1 is an exploded perspective view of a disk drive embodying a preferred embodiment of the invention.

Referring to the drawings, and particularly FIG. 1, there is illustrated a rigid or hard disk magnetic data storage device designated generally by the numeral 10. The hard disk storage device comprises an inner housing 12 and 14 in which the disk assembly of multiple rigid disks is mounted as will be described and which is mounted in an outer housing or chassis 16. A swing arm assembly is mounted for small angle oscillation about a shaft 18 by means of a bearing capsule 20 and comprises a plurality of arms 22 extending outward with read and write heads 24 on the outer ends thereof. The shaft 18 is mounted in a bore 26 in housing 12 by means of a screw assembly. A voice coil cooperates with magnets 30 within the housing 12. The arms 22 extend between and position the heads 24 relative to a plurality of disks of a disk pack which is rotatively mounted at the juncture of the two housing units 12 and 14.

Referring to FIG. 2 of the drawing, a bearing and seal assembly in accordance with the invention is illustrated. As illustrated, a bearing assembly designated generally at 45 includes an inner race 44, and outer race 46 and a seal membrane 52 bonded between them. The membrane 52 is bonded at its inner diameter to the end face of the inner race 44 and at its outer diameter to the end face of the outer race 46.

Referring now to FIG. 3 of the drawings, the oscillating arm assembly 22 is mounted within the severely confined space of housing 12 on a bearing cartridge assembly 20 of shaft 18 extending normal to and connected between upper housing walls 12A and 12B. The housing 12 is sized and structured to fit within a specified form factor and the arm assembly 22 must fit and operate within the confined space between upper and lower housing walls 12A and 12B. The arm assembly 22, as can be seen from FIG. 1, rotates or oscillates back and forth about a central position to align read/write heads 24 with tracks on the disks 34 of the disk pack 32.

The arm assembly is mounted by means of a roller bearing cartridge 20 on a stationary shaft 18 mounted between upper walls 12A and 12B. The term roller bearing as used herein is intended to cover both ball type rollers and substantially cylindrical type rollers. The shaft 18 is mounted within a bore 26 in the upper wall 12A and a bore 36 in the lower wall 12B of the housing 12. This mounting is by suitable cap screws 38 and the like and an expansion gripping ring 40 extending outward and gripping the walls of the respective bores 26 and 36.

The actuating arm assembly 22 is mounted by means of a roller bearing cartridge designated generally at 20 for rotation or oscillation about the axis of the shaft 18. The roller bearing cartridge comprises upper and lower identical roller bearings preferably supported on opposite axial ends of a tubular sleeve 42 in axially spaced relation. The upper roller bearing unit comprises an inner race 44 and an outer race 46 having a plurality of ball bearing rollers disposed therebetween in channels as illustrated. The inner race 44 is press fitted on the outer cylindrical surface of the shaft 18 and the outer race 46 is press fitted, for example, into a bore 50 within the actuating arm assembly. The roller bearings are positioned at the outermost position or ends within the bore 50 of the actuating arm to provide maximum stable support for the arm.

The outside ends of the respective roller bearings are spaced from the respective housing wall by a distance d which in a normal embodiment is on the order of about 2.2 millimeters or 0.086 inches. The height of each bearing unit raceways are on the order of about 6 millimeters. Thus, the spacing between the end of the bearing and the housing of 2.2 millimeters provides the spacing or clearance available for bearing seal.

As previously described, an annular seal 52 has an inner edge secured by suitable adhesive means 54 to the inner race 44 and adhesive means 56 to the outer raceway 46. This seal member 52 may have any number of physical and structural characteristics as will be described. However, it is preferably impervious and elastic and secured such that at home or neutral position of the arm assembly there is no torsional stress in the seal member. The arm assembly 22 in the typical embodiment swings on the order of about 7 to 10 degrees to each side of the neutral or home position. However, in some applications the arm may swing up to 15 degrees to either side of neutral. The seal member 52 is constructed to enable the swing with minimum torque and within the allotted clearance space without deflecting into engagement with the housing walls. A deflection into engagement with the housing wall will cause undue wear and early failure of the seal. Therefore, the seal must have minimum thickness relative to its radius or diameter.

Where a very limited seal clearance space 58 exists between the end of the bearings and the housing, a flat planar seal membrane with minimum axial deflection may be preferred. As shown in FIG. 5, a planar membrane when subjected to rotational torque, buckles in a pattern as illustrated with in plane torsion. The buckling creates ridges or waves 60 that deflect axially outwardly upon the application of tension. These ridges extend from about tangent to the inner diameter outward at an angle to the radial to the outer diameter. The number of degrees of rotation required before buckling occurs depends on the initial tension in the membrane. If the membrane is extended so that isotropic in plane tension is high, buckling can be avoided over the range of rotation of interest. The membrane must have two desirable characteristics for the present application. These are the enablement of the desired degree of rotation with minimal torque and minimal axial displacement or distortion. The maximum axial dimension for the illustrated application is no more than about one quarter the radius of the membrane.

High stress concentrations occur at bonded edges of the membrane as it is rotated. This can cause high distortion and displacement at these edges. These can be reduced by utilization of a flexible adhesive as the adhesive 54 and 56 to bond the membrane to the bearing. The high stress concentrations can also be reduced by making the membrane thicker at the edges and thinner in the center as shown by membrane 52 in FIG. 6.

Referring now to FIGS. 7 and 8, the drawings illustrate an exemplary embodiment of a prestressed membrane and method of making the same. In this embodiment, an elastic membrane 66 is selected and stretched over a first annular ring 68 (FIG. 7) and clamped thereto by means of a second annular ring 70 (FIG. 8). The stretched membrane is placed on the end of the bearing assembly as shown in FIG. 8 wherein an outer race 72 is provided with a ring of adhesive 74 and an inner ring 76 is provided with a ring of adhesive 78. The prestressed membrane is then applied against the surface of the adhesive and allowed to bond thereto. Once the bonding is complete, the excess material is trimmed from the membrane 66 and a hole is formed for mounting of the shaft 18 in the bearing assembly or cartridge. The prestretched membrane allows for full deflection for the 8 to 10 degrees to either side of the central position without axial deflection or distortion. Optimally, the membrane is stretched just enough to allow the full range of motion without distortion and is not overstretched. Overstretching will add unnecessary torque to the membrane. This is an ideal construction for very restricted seal clearance space where any deflection cannot be accommodated. One disadvantage to this construction, however, is that higher torque may be required for rotation of the control arm.

Where adequate amount of clearance is available, certain topographies can be molded into the membrane to accommodate the rotation and stress without undue axial motion. These topographies can be molded to provide minimum stress torque within the range of desired motion. Referring specifically to FIGS. 9 and 10, a membrane 80 is molded with orthogonal sinusoidal dimples within the highest amplitude allowed by the device clearance. The membrane 80 is molded with a plurality of dimples 82 extending axially from the face of the membrane. These dimples may preferably extend in both axial directions along the axis. As clearly illustrated in FIGS. 9 and 10, the sinusoidal waves forming the dimples extend in both the radial and circumferential direction (i.e., orthogonal). This membrane has a very low torque requirement because the membrane can accommodate rotation of the members by bending rather than stretching. The surface of the membrane tends to flatten under stress. The membrane is much less stiff in the bending mode than in the stretching mode. The range of rotation of interest to the added torque requirements becomes very negligible.

Referring to FIG. 11, a membrane 84 is provided with radially spiral ridges or waves 86 extending perpendicular to the lines of tensile stress as illustrated in FIG. 5. The ridge or wave begins substantially perpendicular to the inner diameter edge of the membrane. This construction enables rotation at its inner end in a clock-wise direction with minimal tensile stress or torque. The membrane can accommodate the rotation primarily by bending. This takes considerably less torque than stretch. This construction is optimized for an application where rotation of the outer raceway from the home position is clock-wise only. Other variations will be apparent.

Referring to FIG. 12, a membrane 88 is provided with an additional mirror image pattern to that of the FIG. 11 embodiment. In this embodiment, the membrane 88 is provided spiral ridges 90 and 92 that extend in both directions outward from the inner diameter to the outer periphery or diameter. This structure can accommodate rotation in both directions from the central or neutral positions with minimum torque. Again, these membranes are useful where space is available to accommodate the nominal axial dimension thereof. They are designed to fit and operate within very small axial spaces, typically less than one quarter the outer radius of the seal membrane and preferably less than one tenth the outer radius. They also require very low torque within the range of rotation.

Referring to FIG. 13, an alternate means for attachment of the seal membrane to the raceways of the roller bearings is illustrated. In this embodiment, a seal membrane 94 is secured at its inner edge by means of a clamping ring 96 to an inner race 98. The outer edge of the membrane is attached by means of an outer ring 100 to the outer race 102. The clamping rings provide a overlapping of radially extending lip or flange that overlaps the respective peripheral edge of the seal membrane with a downwardly depending skirt that grippingly engages the cylindrical surface of the respective raceways. This securely clamps the membrane to the bearing raceways of the bearing assembly.

Various combinations of membrane of various construction may be utilized. For example, the membrane may be constructed to be totally impermeable or various degrees of permeability. The membrane may also be constructed to have various degrees of elasticity and may have various degrees of reinforcement, such as by means of fibers. This provides a seal membrane that fits within a very narrow space and yet accommodates the rotation and axial displacement.

EXAMPLE 1

The above described membranes may be used in pairs, one at each end of the bearing assembly or cartridge, as illustrated in FIG. 3. These seals may be identical or they may be different. For example, as shown in FIG. 3, a seal 104 is illustrated extending over and bonded by adhesive or other suitable means 106 and 108 to the outer race 110 and inner race 112 of the lower bearing assembly. This arrangement with identical impermeable membranes provides an impermeable membrane seal at both ends of the bearing cartridge. This construction eliminates all contamination due to grease components from the bearings. However, when temperature changes occur, the air pressure inside the cartridge will change and pressure difference between the inside and outside of the cartridge may cause the membranes to expand or bulge out. This can be eliminated by the provision of a very small diffusion path such as a groove or bore connecting the interior of the cartridge with the exterior ambient air. The time normally required for a complete warm up or cool down in a hard disk unit is on the order of about 45 minutes. As illustrated in FIG. 3, a highly restrictive diffusion tube 114 can easily conduct the required quantity of air from inside the cartridge to the exterior of the actuator during this interval. Under conditions of constant temperature, diffusion to the passage will be negligible.

EXAMPLE 2

A construction can take the form of a single membrane at one end of the bearing cartridge leaving the other end open or with merely a shield. This configuration eliminates axial air flow through the cartridge and cuts the contamination rate due to turbulence and diffusion at the ends of the cartridge by about one-half since it eliminates the gap at one end.

EXAMPLE 3

A further construction can take the form of a semi-permeable membrane at one end and an impermeable membrane at the other end of the cartridge. This construction allows gasses such as oxygen and nitrogen to diffusion through the semi-permeable membrane but prevents the passage of large organic grease molecules. This makes it unnecessary to have a fabricated diffusion passage in the structure of the bearing cartridge.

EXAMPLE 4

The cartridge can be provided with a filter membrane at both ends of the bearing cartridge. The filter membrane decreases but does not eliminate axial air flow diffusion and turbulence. It will block the flow of aerosols and larger molecules. An advantage of a filter of this type such as manufactured by Gore, Inc. from the filamentary teflon is that it has an extremely low force constant in tension. This can be a desirable construction where the very low torque resistance is required.

While we have illustrated and described our invention by numerous embodiments, it is to be understood changes and modifications may be made therein without departing from spirit and scope of the invention as defined herein.

We claim:

1. A bearing seal assembly adapted for fitting within a confined axial space for enabling small angle oscillations of an oscillating arm, said seal assembly comprising:
   an outer bearing raceway defining one boundary of said confined space;
   an inner bearing raceway mounted concentric with said outer raceway;
   an annular elastic membrane having structure and configuration of a selected one of (a) molded with multiple orthogonal sinusoidal dimples extending in line both radially and circumferentially of said membrane and (b) a substantially planar configuration stretched in plane isotopically in tension throughout said membrane before being attached to said inner and outer raceways, said membrane having an inner peripheral edge sealingly secured to said inner raceway, and an outer peripheral edge sealingly secured to said outer raceway, said membrane having no torsional strain at a neutral position of said inner raceway and said outer raceway, and said membrane having a structure and configuration for enabling predetermined limited relative oscillation between said inner raceway and said outer raceway with minimum torque and with minimum axial distortion of said membrane within said axial space.

2. A bearing seal assembly according to claim 1 wherein said membrane has a substantially planar configuration and is stretched isotropically in tension throughout said membrane before being attached to said inner and outer raceways to thereby enable predetermined limited oscillation between said raceways without distortion of said membrane.

3. A bearing seal assembly according to claim 1 wherein said membrane is molded to have multiple orthogonal sinusoidal dimples disposed in line both radially and circumferentially throughout said membrane.

4. A bearing seal assembly according to claim 3 wherein said membrane is molded to form waves having radially extending troughs.

5. A bearing seal assembly according to claim 1 wherein both ends of said bearing assembly are covered by one of said annualar elastic membrane.

6. A bearing seal assembly according to claim 1 wherein said inner and outer races are restricted to plus or minus 15 degrees of motion.

7. A bearing seal assembly according to claim 6 wherein said bearing assembly is vented by a diffusion path.

8. A bearing seal assembly according to claim 6 wherein said membrane is substantially impermeable to organic vapors and substantially permeable to atmospheric gasses including nitrogen and oxygen.

9. A bearing seal assembly according to claim 1 wherein said membrane is attached to said inner and outer raceways by elastic adhesive bonding.

10. A bearing seal assembly according to claim 2 wherein said membrane is attached to said inner and outer raceways by mechanical clamping means.

11. A bearing seal assembly adapted to be mounted in a closely confirmed axial space for accommodating small angle oscillations of an oscillating actuator, comprising:

an outer bearing raceway;

an inner bearing raceway mounted concentric with said outer raceway; and an annular elastic membrane having an inner peripheral edge defining an inner diameter and an outer peripheral edge defining an outer diameter, first means sealingly securing said inner peripheral edge to said inner bearing raceway, and second means sealingly securing said outer peripheral edge to said outer raceway, said membrane being pre-stretched isotropically throughout said entire membrane between said first means and said second means and said membrane forming a substantially planar seal structure having sufficient isotropic in-plane tension enabling limited relative rotation between said inner raceway and said outer raceway within a predetermined range with minimum torque and without buckling of said membrane so that said membrane has a maximum axial dimension to thereby occupy a space of not more than one tenth the outer radius thereof.

12. A bearing seal assembly according to claim 11 wherein both ends of said bearing assembly are covered by one of said annualar elastic membrane.

13. A bearing seal assembly according to claim 11 wherein said bearing assembly is vented by a diffusion path.

14. A bearing seal assembly according to claim 11 wherein said membrane is under no torsional strain at the center of its range of motion.

15. A bearing seal assembly according to claim 14 wherein said inner and outer races are restricted to plus or minus 15 degrees of motion.

16. A bearing seal assembly according to claim 14 wherein said membrane is substantially impermeable to organic vapors and substantially permeable to atmospheric gasses including nitrogen and oxygen.

17. A bearing seal assembly according to claim 16 wherein said membrane is attached to said inner and outer raceways by adhesive bonding.

18. A bearing seal assembly adapted for fitting within a closely confirmed axial space for enabling small angle oscillations of an oscillating arm, comprising:

an outer bearing raceway forming a boundary of said confined space;

an inner bearing raceway mounted concentric with said outer raceway; and an annular elastic membrane having an inner peripheral edge, an outer peripheral edge, and an axial length and dimension to occupy said confined axial space, first means sealingly securing said inner peripheral edge to said inner bearing raceway, and second means sealingly securing said outer peripheral edge to said outer raceway, said membrane having a structure and configuration of a selected one of (a) molded with multiple orthogonal sinusoidal dimples extending extending in line both radially and circumferentially of said membrane and (b) a substantially planar configuration stretched in plane isotropically in tension throughout said membrane before being attached to said inner and outer raceways, said membrane further having no torsional strain at said neutral position of said oscillating arm and having a structure and configuration for enabling limited relative rotation between said inner raceway and said outer raceway with minimum torque and axial distortion of said membrane.

19. A bearing seal assembly according to claim 18 wherein both ends of said bearing assembly are covered by one of said annualar elastic membrane.

20. A bearing seal assembly according to claim 19 wherein said membrane is substantially impermeable to organic vapors and substantially permeable to atmospheric gasses including nitrogen and oxygen.

* * * * *